(12) United States Patent
Jin (10) Patent No.: US 8,063,918 B2
(45) Date of Patent: Nov. 22, 2011

(54) METHOD AND APPARATUS FOR RENDERING IMAGES WITH AND WITHOUT RADIALLY SYMMETRIC DISTORTIONS

(75) Inventor: Hailin Jin, Campbell, CA (US)

(73) Assignee: Adobe Systems Incorporated, San Jose, CA (US)

( * ) Notice: Subject to any disclaimer, the term of this patent is extended or adjusted under 35 U.S.C. 154(b) by 773 days.

(21) Appl. No.: 12/128,164

(22) Filed: May 28, 2008

(65) Prior Publication Data
US 2009/0295818 A1    Dec. 3, 2009

(51) Int. Cl.
G09G 5/00    (2006.01)
(52) U.S. Cl. .................................. 345/647; 345/634
(58) Field of Classification Search .................. 345/647, 345/634
See application file for complete search history.

(56) References Cited

U.S. PATENT DOCUMENTS

| | | | |
|---|---|---|---|
| 5,892,590 A | 4/1999 | Ida et al. | |
| 6,816,625 B2 | 11/2004 | Lewis, Jr. et al. | |
| 7,126,616 B2 * | 10/2006 | Jasa et al. | 345/645 |
| 7,245,761 B2 | 7/2007 | Swaminathan et al. | |
| 7,280,706 B2 | 10/2007 | Wu et al. | |
| 2004/0012544 A1 | 1/2004 | Swaminathan et al. | |
| 2004/0156558 A1 | 8/2004 | Kim | |

OTHER PUBLICATIONS

U.S. Appl. No. 12/390,317, filed Feb. 20, 2009.
James C. Wyant, "Basic Wavefront Aberration Theory for Optical Metrology," 1992.
Jean-Philippe Tardif, Peter Sturm, and Sebastien Roy, "Self-calibration of a general radially symmetric distortion model," ECCV 2006.
Dongil Han, "Real-Time Digital Image Warping for Display Distortion Correction," ICIAR 2005, LNCS 3656, pp. 1258-1265, Springer-Verlag Berlin Heidelberg, 2005.
Karl M. Fant, et al., "A Nonaliasing, Real-Time Spatial Transform Technique," IEEE, 1986.
Ed Catmull, et al., "3-D Transformations of Images in Scanline Order," ACM, 1980.
Philip K. Robertson, "Spatial Transformations for Rapid Scan-Line Surface Shadowing," IEEE Computer Graphics and Applications, Mar. 1989, No. 2, Los Alamitos, CA.
Donald Fraser, "Comparison at High Spatial Frequencies of Two-Pass and One-Pass Geometric Transformation Algorithms," Computer Vision, Graphics and Image Processing 46, 267-283, No. 3, Jun. 1989.
Alvy Ray Smith, "Planar 2-Pass Texture Mapping and Warping," ACM Computer Graphics, vol. 21, No. 4, Jul. 1987.
Chein-Wei Jen, et al., "Two-Level Pipeline Design for Image Resampling," V2.6, IEEE 1989.
Gergely Vass, et al., "Applying and Removing Lens Distortion in Post Production," Second Hungarian Conference on Computer Graphics and Geometry, 2003, pp. 1-8.
George Wolberg, et al., Separable Image Warping with Spatial Lookup Tables, Dept. of Computer Science, Columbia University, Computer Graphics, vol. 23, No. 3, Jul. 1989.
International Search Report from PCT/US2009/045277 mailed Aug. 25, 2009.

* cited by examiner

*Primary Examiner* — M Good Johnson
(74) *Attorney, Agent, or Firm* — Robert C. Kowert; Meyertons, Hood, Kivlin, Kowert & Goetzel, P.C.

(57) ABSTRACT

A method and apparatus for rendering images with and without radially symmetric distortions is described in which the forward and backward radial distortion rendering processes are decomposed into two stages. One-dimensional elements in one planar dimension (rows or columns) of an input image are rendered to generate an intermediate buffer, and then one-dimensional elements in the other planar dimension (columns or rows) of the intermediate buffer are rendered to generate an output image. Thus, one-dimensional sampling is performed, and interpolation may be performed in one planar dimension, rather than 2-D interpolation. An input row or column may be decimated, if necessary, before row or column interpolation is performed to generate an output row or column.

35 Claims, 9 Drawing Sheets

METHOD AND APPARATUS FOR RENDERING IMAGES WITH AND WITHOUT RADIALLY SYMMETRIC DISTORTIONS

BACKGROUND

Description of the Related Art

Figure 1A:
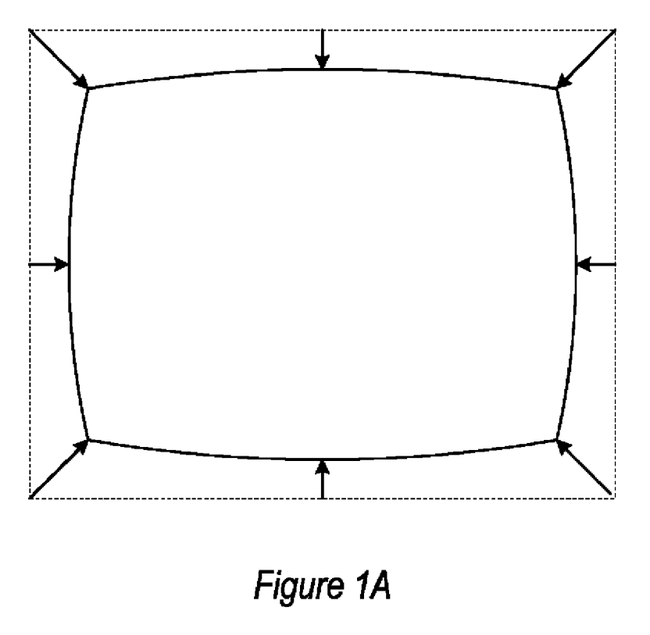
FIGS. 1A and 1B illustrate barrel distortion and pincushion distortion, respectively.
Figure 1B:
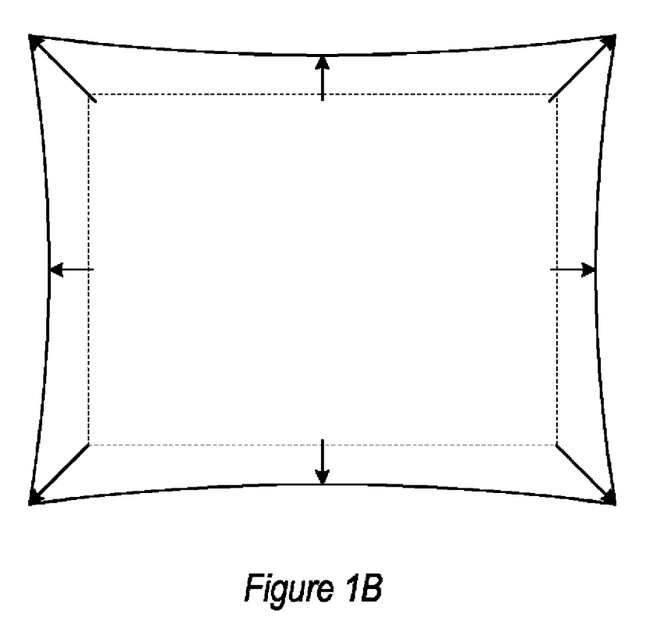

Radially symmetric distortion, or simply radial distortion, is a particular type of image distortion that may be seen in captured images, for example as a result of the optical characteristics of lenses in conventional (film) and digital cameras. In addition to radial distortion being introduced into images by lenses during image capture, radial distortion may be applied as an effect to either natural images (images of the "real world" captured with a conventional or digital camera) or synthetic images (e.g., computer-generated, or digitally synthesized, images). Radial distortion may be classified into two types: barrel distortion and pincushion distortion. FIG. 1A illustrates barrel distortion, and FIG. 1B illustrates pincushion distortion. Note that barrel distortion is typically associated with wide-angle lenses, and pincushion distortion is typically associated with long-range or telescopic lenses.

Figure 2A:
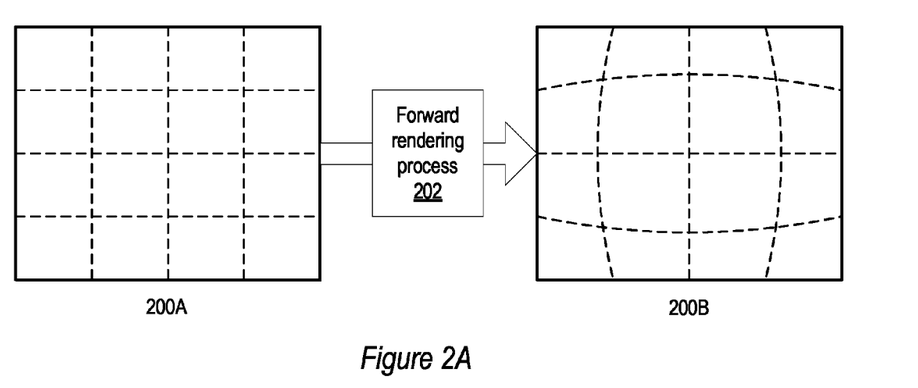
FIGS. 2A and 2B illustrate the forward radial distortion rendering process.
Figure 2B:
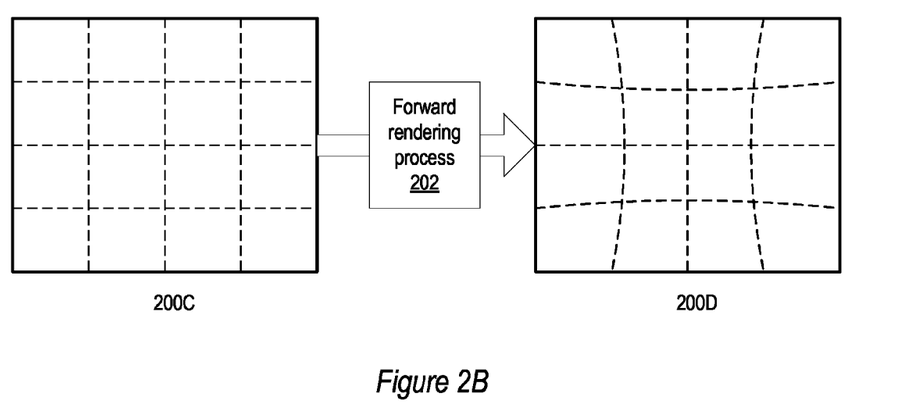
Figure 3A:
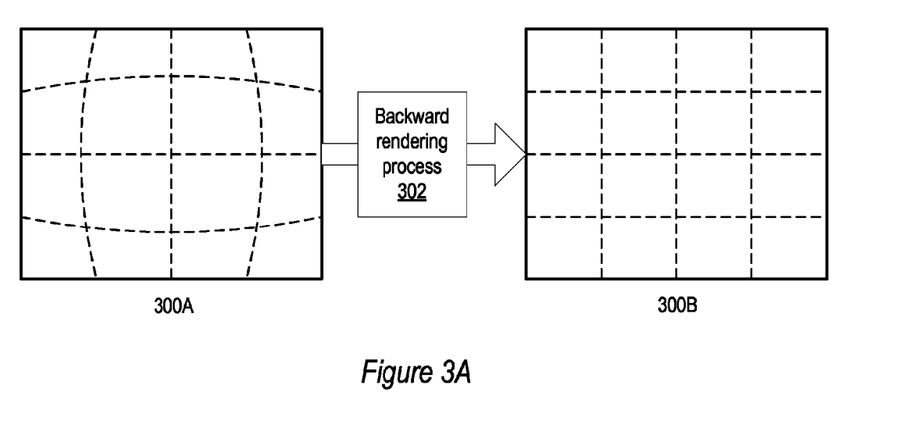
FIGS. 3A and 3B illustrate the backward radial distortion rendering process.
Figure 3B:
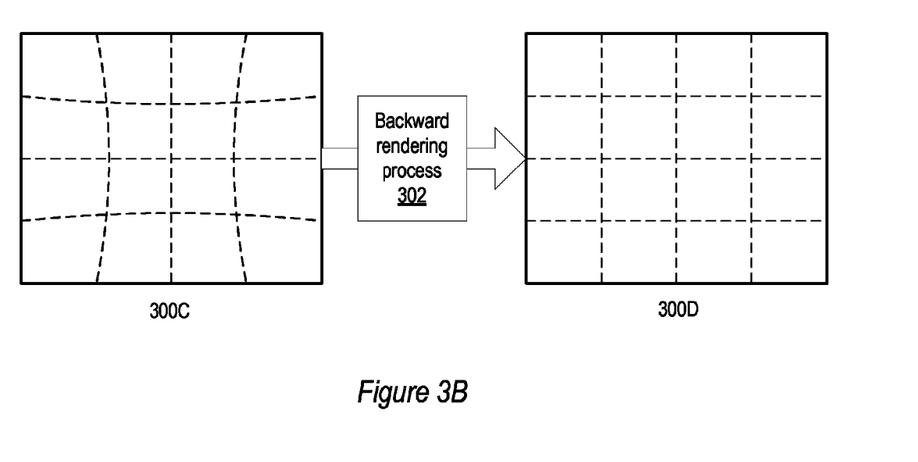

In digital image processing, a forward radial distortion rendering process renders an image with either barrel or pincushion radial distortion from an image with little or no radial distortion. FIG. 2A illustrates a forward rendering process 202 rendering an image with barrel distortion 200B from an input image with little or no distortion 200A. FIG. 2B illustrates a forward rendering process 202 rendering an image with pincushion distortion 200D from an input image with little or no distortion 200C. A backward radial distortion rendering process renders an image with little or no barrel or pincushion radial distortion from an image with barrel or pincushion radial distortion. FIG. 3A illustrates a backward rendering process rendering an image with little or no distortion 300B from an input image with barrel distortion 300A. FIG. 3B illustrates a backward rendering process rendering an image with little or no distortion 300D from an input image with pincushion distortion 300C. Note that the images in FIGS. 2A, 2B, 3A and 3B may be images digitized from photographs or negatives captured with a conventional camera, images captured with a digital camera, digitally synthesized images, composite images from two or more sources, or in general images from any source.

Conventionally, in digital image processing, both forward and backward radial distortion rendering has been performed using a two-dimensional (2-D) sampling process. For example, in a conventional forward radial distortion rendering process, a grid may be set in the output image (the image with radial distortion). For each point in the grid, a corresponding location is found in the input image (the image with little or no radial distortion) by reverting the distortion equation. Since this location may not have integral coordinates, 2-D interpolation may be used to obtain the intensity value.

There are problems associated with these conventional radial distortion rendering algorithms. One problem is that the conventional algorithms are not very efficient; either the forward distortion equation or the backward distortion equation has to be solved for each point in the image. Another problem is that interpolation is done in two-dimensional (2-D) space, which is inefficient when sophisticated interpolation algorithms such as cubic interpolation are used. In addition, conventional radial distortion rendering algorithms may suffer from aliasing problems. Aliasing refers to a distortion or artifact that is caused by a signal being sampled and reconstructed as an alias of the original signal. An example of image aliasing is the Moiré pattern that may be observed in a poorly pixelized image of a brick wall. Conventional radial distortion rendering algorithms, which perform interpolation in 2-D space, may by so doing introduce aliasing artifacts into the output images.

SUMMARY

Various embodiments of a method and apparatus for rendering images with and without radially symmetric distortions are described. Embodiments decompose both the forward and backward radial distortion rendering processes into two stages. Embodiments render one-dimensional elements in one planar dimension (rows or columns) of an input image to generate an intermediate buffer, and then render one-dimensional elements in the other planar dimension (columns or rows) of the intermediate buffer to generate an output image. Thus, one-dimensional sampling is performed, and interpolation may be performed in one planar dimension, rather than 2-D interpolation. Implementations of embodiments of the method for rendering images with and without radially symmetric distortions may be referred to herein as a radial distortion rendering module.

Embodiments of the radial distortion rendering module may implement one or both of two radial distortion rendering algorithms or processes as components. A forward radial distortion rendering component renders images with radial distortion from images with little or no radial distortion. A backward radial distortion rendering component renders images with little or no radial distortion from images with radial distortion. In one embodiment, the radial distortion rendering module receive an input image, and iteratively renders rows in the input image to generate an intermediate buffer. The radial distortion rendering module then iteratively renders columns in the intermediate buffer to generate an output image. In another embodiment, column rendering may be performed first to generate the intermediate buffer, and then row rendering performed on the intermediate buffer to generate the output image.

Unlike conventional radial distortion rendering processes, embodiments decompose both the forward and backward radial distortion rendering processes into two stages. In each stage, only one row or one column of an image is rendered. In each stage, a simpler equation than the full distortion equation used in conventional methods is solved. Moreover, interpolation is performed in each stage in one-dimensional space (i.e., on one row or one column at a time), which is more efficient than 2-D interpolation, and reduces or eliminates aliasing artifacts that may be introduced in 2-D interpolation. Because embodiments perform one-dimensional (row or column) sampling, in both the forward and backward radial distortion rendering processes, an input row or column may be decimated, if necessary, before row or column interpolation is performed to generate an output row or column. Decimation is important in reducing or eliminating aliasing artifacts.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Various embodiments of a method and apparatus for rendering images with and without radially symmetric distortions are described. Embodiments decompose both the forward and backward radial distortion rendering processes into two stages. Embodiments render one-dimensional elements in one planar dimension (rows or columns) of an input image to generate an intermediate buffer, and then render one-dimensional elements in the other planar dimension (columns or rows) of the intermediate buffer, to generate an output image. Thus, one-dimensional sampling is performed, and interpolation may be performed in one planar dimension, rather than 2-D interpolation. Embodiments of a method for rendering images with and without radially symmetric distortions may be implemented as or in a tool, module, library function, plug-in, stand-alone application, etc. For simplicity, implementations of embodiments may be referred to herein as a radial distortion rendering module.

Figure 4:
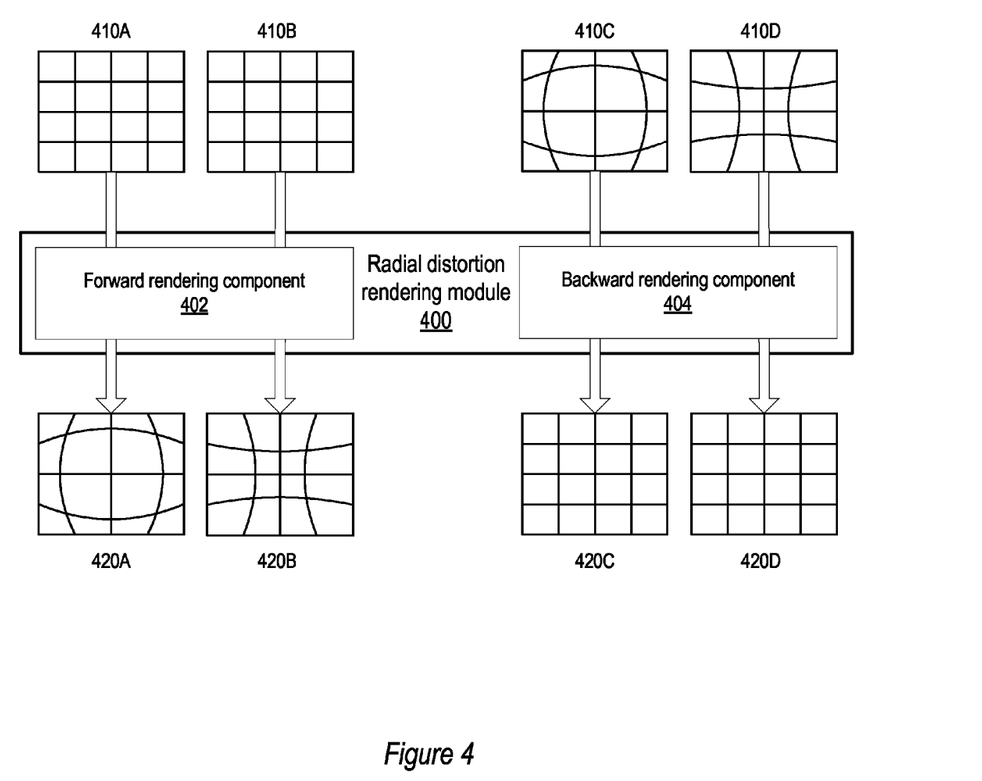
FIG. 4 illustrates forward and backward rendering components of a radial distortion rendering module, according to one embodiment.

FIG. 4 illustrates forward and backward rendering components of a radial distortion rendering module, according to one embodiment. Various embodiments of the radial distortion rendering module 400 may implement one or both of two radial distortion rendering algorithms or processes, as described herein, as components. A forward radial distortion rendering component 402 renders images with radial distortion (e.g., images 420A and 420B) from images with little or no radial distortion (e.g., images 410A and 410B). A backward radial distortion rendering component 404 renders images with little or no radial distortion (images 420C and 420D) from images with radial distortion (images 410C and 410D). The radial distortion rendering algorithms implemented by components 402 and 404 are efficient and provide improved interpolation in sampling when compared to conventional radial distortion rendering processes. In addition, the radial distortion rendering algorithms reduce or eliminate aliasing, which is a problem in conventional radial distortion rendering processes.

Figure 8:
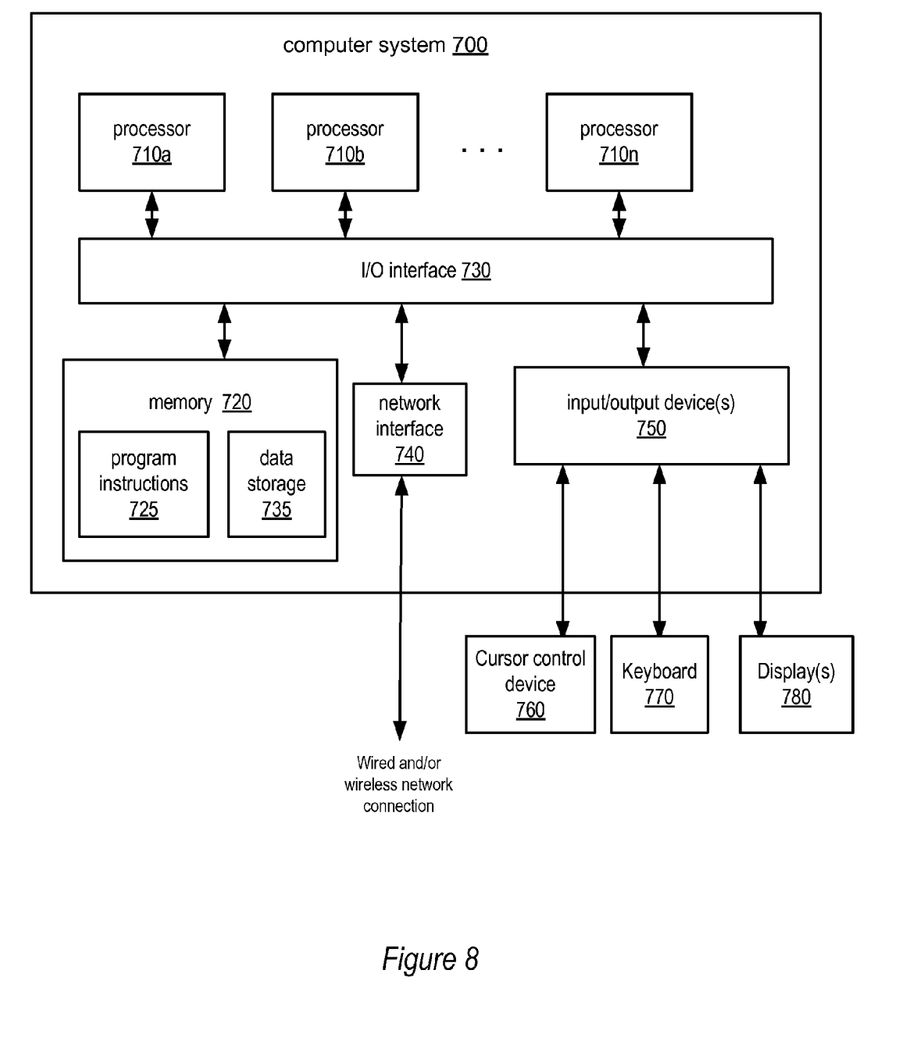
FIG. 8 illustrates an exemplary computer system that may be used in embodiments.

Embodiments of a radial distortion rendering module 400 may be implemented on a computer system. An exemplary system on which embodiments may be implemented is illustrated in FIG. 8. Radial distortion rendering module 400 may be implemented as or in a tool, module, library function, plug-in, stand-alone application, etc. Embodiments of the radial distortion rendering module may be implemented, for example, in various digital image processing applications. An exemplary application in which embodiments may be implemented is Adobe Photoshop®.

Radial distortion rendering module 400 may provide a user interface that provides one or more textual and/or graphical user interface elements, modes or techniques via which a user may control various aspects of the radial distortion rendering process. For example, the user interface may include user interface elements that allow a user to select input and output files, to specify whether a forward or backward radial distortion rendering is to be performed, to specify the type of radial distortion (barrel or pincushion), to control the degree of radial distortion to be introduced or removed, and so on.

The input images 410 may be any type of images, for example images digitized from photographs or negatives captured with a conventional camera, digital images captured with a digital camera, digital images captured with a photosensor such as a charge-coupled device (CCD), digitally synthesized images, composite images from two or more sources, panoramic images, component images to be stitched into a panoramic image, images from a video stream, and so on.

Figure 5:
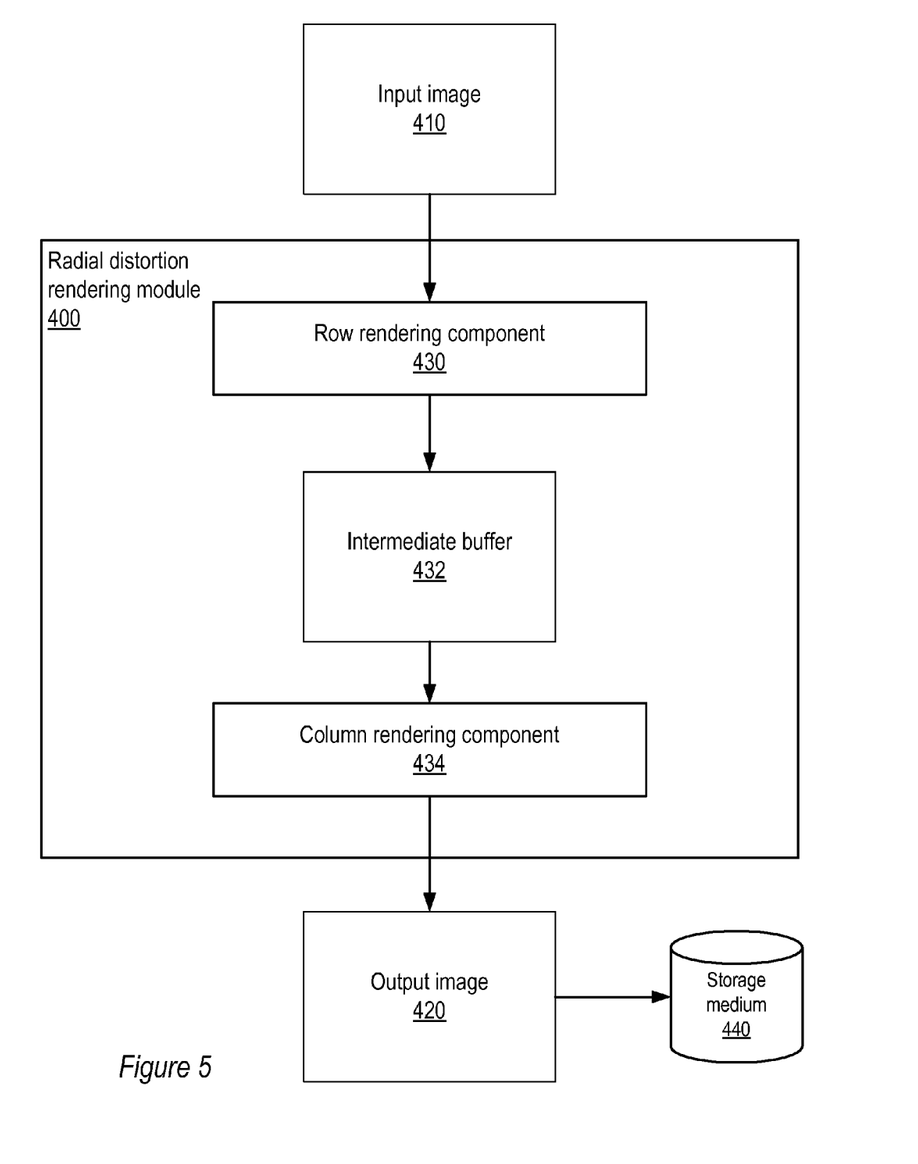
FIG. 5 illustrates a radial distortion rendering module and shows a general, high-level architecture that may be shared by both the forward and backward rendering components, according to one embodiment.

FIG. 5 illustrates a radial distortion rendering module and shows a general, high-level architecture that may be shared by both the forward and backward rendering components, according to one embodiment. Unlike conventional radial distortion rendering processes, embodiments of radial distortion rendering module 400 decompose both the forward and backward radial distortion rendering processes into two stages. In each stage, only one row or one column of an image is rendered. In each stage, a simpler equation than the full distortion equation is solved. Moreover, interpolation is performed in each stage in one-dimensional space (i.e., on one row or one column at a time), which is more efficient than 2-D interpolation, and reduces or eliminates aliasing artifacts that may be introduced in 2-D interpolation. Because embodiments perform one-dimensional (row or column) sampling, in both the forward and backward radial distortion rendering processes, an input row or column may be decimated, if necessary, before row or column interpolation is performed to generate an output row or column. Decimation is important in reducing or eliminating aliasing artifacts.

Referring to FIG. 5, radial distortion rendering module 400 receives an input image 410. Row rendering component 430 iteratively renders rows in input image 410 to generate an intermediate buffer 432. Column rendering component 434 then iteratively renders columns in intermediate buffer 432 to generate an output image 420. Output image 420 may, for example, be stored to a storage medium 440, such as system memory, a disk drive, DVD, CD, etc. In one embodiment, column rendering may be performed first to generate intermediate buffer 432, and then row rendering performed on intermediate buffer 432 to generate output image 420.

Figure 6A:
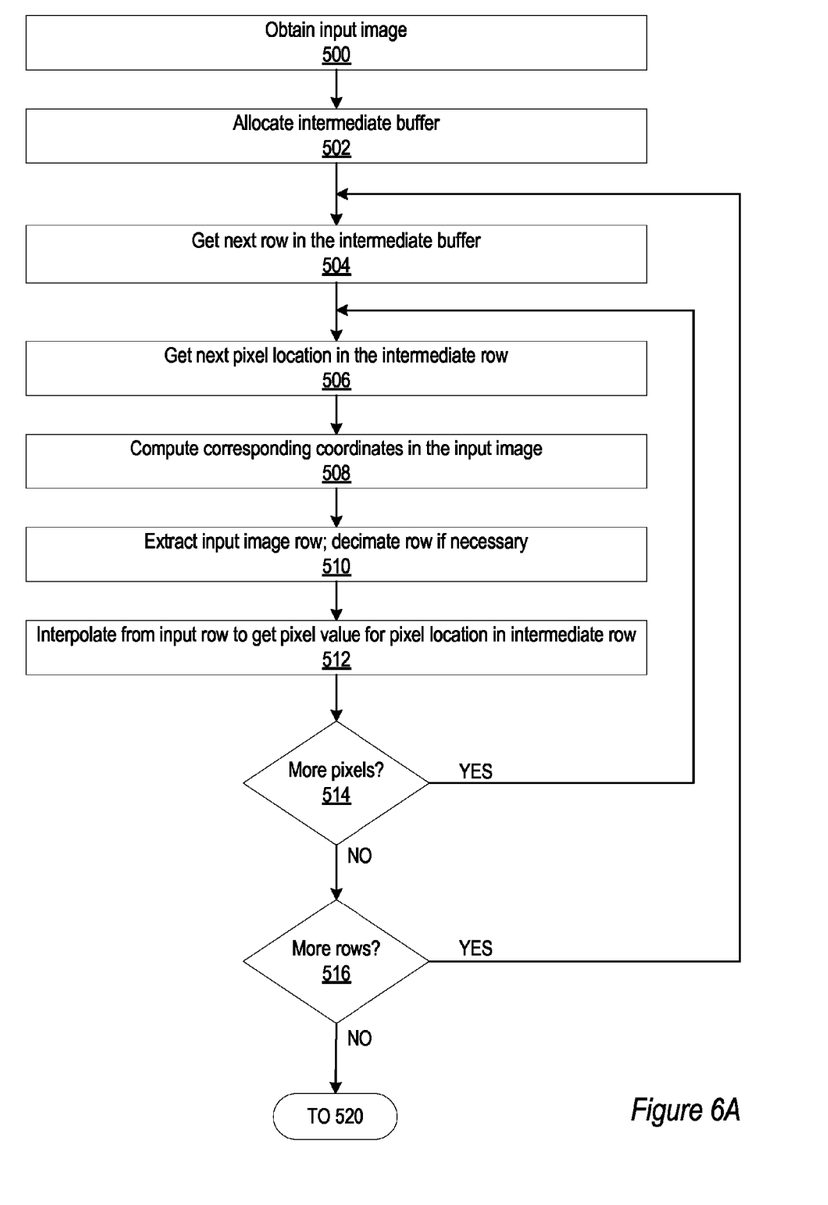
FIGS. 6A and 6B illustrate a method for rendering images with and without radially symmetric distortions, according to one embodiment.
Figure 6B:
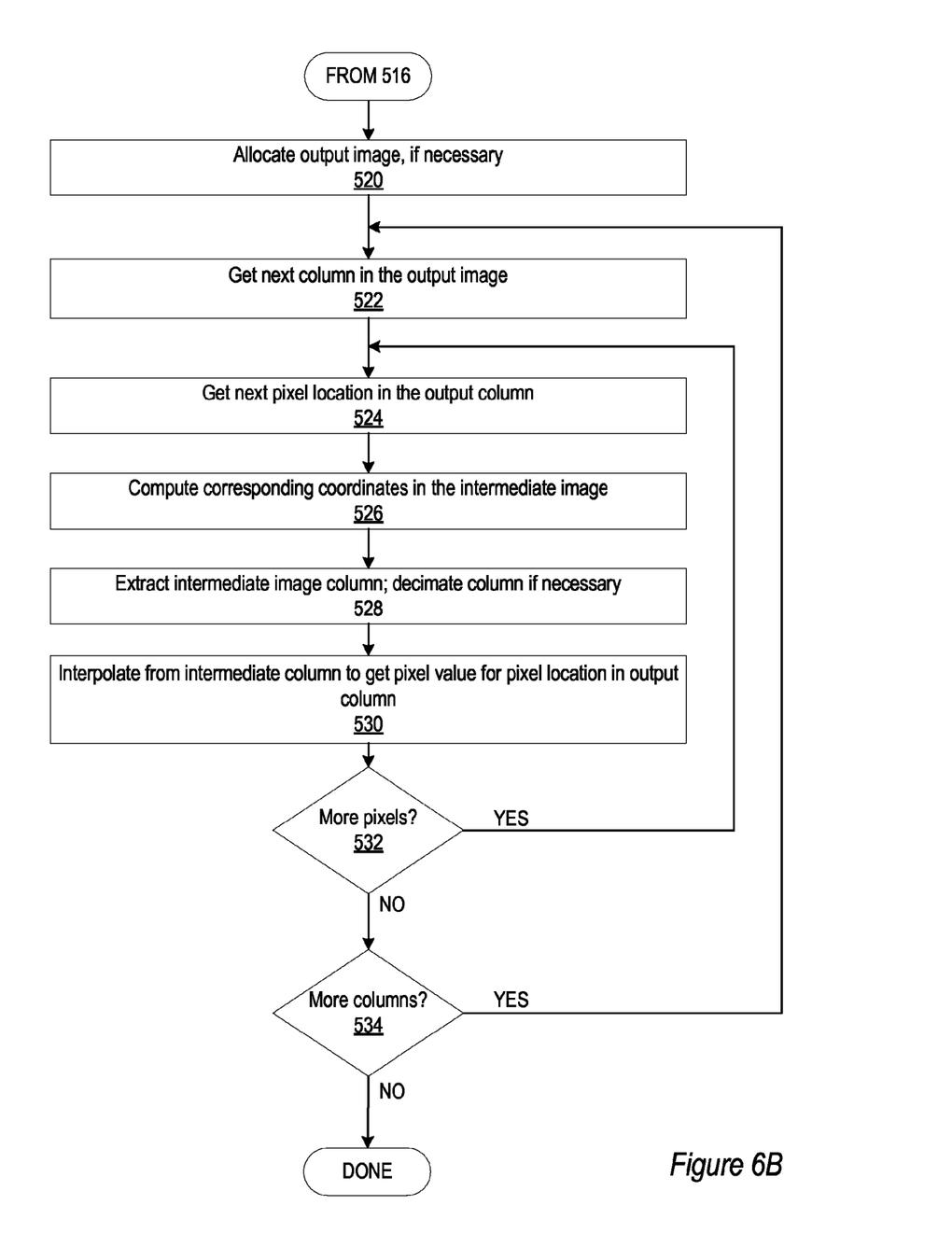

FIGS. 6A and 6B illustrate a method for rendering images with and without radially symmetric distortions, according to one embodiment. The method may be implemented in both the forward and backward rendering components illustrated in FIG. 4. Elements 504 through 516 of FIG. 6A may be implemented in row rendering component 430 of FIG. 5, while elements 522 through 534 of FIG. 6B may be implemented in column rendering component 434 of FIG. 5. While FIGS. 6A and 6B illustrate row rendering performed first, and then column rendering, in one embodiment, column rendering may be performed first, and then row rendering.

Referring to FIG. 6A, as indicated at 500, an input image is obtained. The input image may either be an image with little or no distortion from which an image with radial distortion is to be generated in a forward rendering process, or an image with radial distortion from which an image with little or no radial distortion is to be generated in a backward rendering process.

As indicated at 502, an intermediate buffer may be allocated. The intermediate buffer may be allocated based on the dimensions of the input image. Note that the dimensions of the intermediate buffer may be larger or smaller than the dimensions of the input image if the output image is to be larger or smaller than the input image.

As indicated at 504, a next row in the intermediate buffer is selected. The row rendering process starts at a first row. Which row the process starts with and in what order the rows are processed may not matter, but for simplicity it may be assumed that the process starts at the first or top row, and sequentially processes the rows.

As indicated at 506, a next pixel location p, q in the current intermediate buffer row is selected. The row rendering process starts at a first pixel location in the intermediate row. Which pixel location the process starts with and in what order the pixels are processed may not matter, but for simplicity it may be assumed that the process starts at the first pixel location, and sequentially processes the pixels. Note that q will be the same for the entire row.

As indicated at 508, corresponding coordinates for the current pixel location in the intermediate buffer row are computed in the input image. Note that the pixel coordinates are not necessarily integral; hence, an interpolation technique may be used to calculate pixel values in the intermediate buffer row from pixel values in the input image row.

As indicated at 510, the corresponding input image row (q) may be extracted, if necessary. The extracted input image row may be decimated, if necessary. Decimation may be necessary if the size of the rows in the intermediate buffer (and in the output image) are substantially smaller than the size of the rows in the input image. Also note that 510 (row extraction and decimation) may be performed only once for each row in the input image, e.g. when the first pixel in the intermediate buffer row is being calculated, and thus not performed for each pixel in the intermediate row.

As indicated at 512, 1-D (one dimensional) interpolation is applied to the extracted and possibly decimated input row to get the pixel value for the current pixel location in the intermediate row. Any of various interpolation techniques may be used, including, but not limited to, linear and cubic interpolation.

At 514, if there are more pixels in the intermediate buffer row to be calculated, the method returns to 506 to calculate the value for the next pixel in the row. If the intermediate buffer row has been fully rendered, i.e. if all pixel values for the row have been calculated, then at 516, if there are more rows in the intermediate buffer, the method returns to 504. If all rows in the intermediate buffer have been rendered, then the method goes to 520 of FIG. 6B.

Referring to FIG. 6B, as indicated at 520, an output image may be allocated, if necessary. Note that the output image may have been previously allocated, for example before element 504 of FIG. 6A. The output image may be allocated based on the dimensions of the input image. Note that the dimensions of the output image may be the same as, larger or smaller than the dimensions of the input image.

As indicated at 522, a next column in the output image is selected. The column rendering process starts at a first column. Which column the process starts with and in what order the columns are processed may not matter, but for simplicity it may be assumed that the process starts at the first or leftmost column, and sequentially processes the columns.

As indicated at 524, a next pixel location p, q in the current output image column is selected. The column rendering process starts at a first pixel location in the output image column. Which pixel location the process starts with and in what order the pixels are processed may not matter, but for simplicity it may be assumed that the process starts at the first pixel location, and sequentially processes the pixels. Note that p will be the same for the entire column.

As indicated at 526, corresponding coordinates for the current pixel location in the output image column are computed in the intermediate buffer. Note that the pixel coordinates are not necessarily integral; hence, an interpolation technique may be used to calculate pixel values in the output image column from pixel values in the intermediate buffer column.

As indicated at 528, the corresponding intermediate buffer column (p) may be extracted, if necessary. The extracted intermediate buffer column may be decimated, if necessary. Decimation may be necessary if the size of the columns in the output image are substantially smaller than the size of the columns in the input image. Also note that 528 (column extraction and decimation) may be performed only once for each column in the intermediate buffer, e.g. when the first pixel in the current output image column is being calculated, and thus not performed for each pixel in the output image column.

As indicated at 530, 1-D (one dimensional) interpolation is applied to the extracted and possibly decimated intermediate buffer column to get the pixel value for the current pixel location in the output image column. Any of various interpolation techniques may be used, including, but not limited to, linear and cubic interpolation.

At 532, if there are more pixels in output image column to be calculated, the method returns to 524 to calculate the value for the next pixel in the row. If the output image column has been fully rendered, i.e. if all pixel values for the column have been calculated, then at 534, if there are more columns in the output image, the method returns to 522. If all columns in the output image have been rendered, then the output image has been fully rendered. The output image may, for example, be stored to a storage medium, as illustrated in FIG. 5.

While the high-level architecture illustrated in FIG. 5 and the method flowcharted in FIGS. 6A and 6B are substantially similar in both the forward and backward rendering components, the particular implementation of the row rendering component 430 and the column rendering component 434 are somewhat different for the forward and backward rendering components, as described below.

Radial Distortion Rendering Algorithms

The following provides more details on the forward and backward rendering processes according to one embodiment, provides exemplary formulas that may be used at the various steps of the forward and backward radial distortion rendering processes, and illustrates the differences in the two processes. Radially symmetric distortions may be effectively modeled by a fourth-order equation as follows:

$$[x, y] \rightarrow [x(1+k_1(x^2+y^2)+k_2(x^2+y^2)^2), y(1+k_1(x^2+y^2)+k_2(x^2+y^2)^2)]$$

where k is the distortion coefficient, assumed to be known. The last term may be denoted as $[x_d, y_d]$, where the subscript d denotes distortion. (x, y) is related to image coordinates (p, q) through the following:

$$x = \frac{p - c_x}{f}$$

$$y = \frac{q - c_y}{f}$$

where f and $[c_x, c_y]$ are the focal length and the center of the image, respectively, and are assumed known. Likewise, $(x_d, y_d)$ is related to image coordinates $(p_d, q_d)$ through the following:

$$x_d = \frac{p_d - c_{xd}}{f_d}$$

$$y_d = \frac{q_d - c_{yd}}{f_d}$$

where $f_d$ and $[c_{xd}, c_{yd}]$ are the focal length and the center of the image, respectively, and are assumed known.

The task of the forward radial distortion rendering process, which may be implemented by forward rendering component 402 of FIG. 4, is to render an image $(I_d)$ with coordinates $(p_d, q_d)$ from an image (I) with coordinates (p, q), while the task of the backward radial distortion rendering process, which may be implemented by backward rendering component 404 of FIG. 4, is to render an image (I) with coordinates (p, q) from an image $(I_d)$ with coordinates $(p_d, q_d)$. In general, in the following equations, (x, y) are used to designate input coordinates, and (p, q) are used to designate output coordinates. The subscript $_d$ is used to signify distortion.

While embodiments of the forward and backward radial distortion rendering processes are generally described as processing rows first and then processing columns, the processing may be reversed in some embodiments, processing columns first and then rows. Generally speaking, the input image may be rendered first in one planar (x or y) dimension (whether rows or columns) to generate an intermediate image or buffer, and then the intermediate image may be rendered in the other planar dimension to generate an output image.

Forward Process (I→$I_d$)

The following describes a forward radial distortion rendering algorithm which may be implemented by forward rendering component 402 of radial distortion rendering module 400, as illustrated in FIG. 4, according to one embodiment. Both FIGS. 4 and 5 are referred to.

A 2-D temporary buffer of proper size is allocated based on the input image 410. This buffer corresponds to intermediate buffer 432 of FIG. 5.

The following describes processing performed by row rendering component 430 of forward rendering component 402, as illustrated in FIG. 5, according to one embodiment.

For each row in the intermediate buffer 432, row rendering component 430 of forward rendering component 402 performs the following. Let $(p_d, q)$ be the coordinates for a pixel in the temporary row. Note that q would be the same for the entire row. Calculate $(x_d, y)$ based on:

$$x_d = \frac{p_d - c_{xd}}{f_d}$$

$$y = \frac{q - c_y}{f}$$

x may be computed by solving the following equation:

$$x_d = x(1 + k_1(x^2 + y^2) + k_2(x^2 + y^2)^2)$$

p may be calculated based on:

$$p = x \ast f + c_x$$

The input row buffer at position q is extracted. The input row buffer may be decimated, if necessary. Interpolation is performed at (p, q) to generate the row in the intermediate buffer 432.

The following describes processing performed by column rendering component 434 of forward rendering component 402, as illustrated in FIG. 5, according to one embodiment.

For each column in the output image 420, column rendering component 434 of forward rendering component 402 performs the following. Let $(p_d, q_d)$ be the coordinates for a pixel in the output column. Note that $p_d$ would be the same for the entire column. $(x_d, y_d)$ may be calculated based on:

$$x_d = \frac{p_d - c_{xd}}{f_d}$$

$$y_d = \frac{q_d - c_{yd}}{f_d}$$

$\rho_d$ may be calculated based on:

$$\rho_d = \sqrt{x_d^2 + y_d^2}$$

ρ may be computed by solving the following equation:

$$\rho_d = \rho(1 + k_1\rho^2 + k_2\rho^4)$$

y may be computed as follows:

$$y = \frac{y_d}{(1 + k_1\rho^2 + k_2\rho^4)}$$

q may be calculated based on:

$$q = y \ast f + c_y$$

The temporary column at position p may be extracted. The extracted temporary column buffer may be decimated, if necessary. Interpolation may be performed at $(p, q_d)$ to generate the column in the output image 420.

Backward Process $I_d$→I)

The following describes a backward radial distortion rendering algorithm which may be implemented by backward rendering component 404 of radial distortion rendering module 400, as illustrated in FIG. 4, according to one embodiment. Both FIGS. 4 and 5 are referred to.

A 2-D temporary buffer of proper size is allocated based on the input image 410. This buffer corresponds to intermediate buffer 432 of FIG. 5.

The following describes processing performed by row rendering component 430 of backward rendering component 404, as illustrated in FIG. 5, according to one embodiment.

For each row in the intermediate buffer 432, row rendering component 430 of backward rendering component 404 performs the following. Let $(p, q_d)$ be the coordinates for a pixel in the temporary row. Note that $q_d$ would be the same for the entire row. $(x, y_d)$ may be calculated based on:

$$x = \frac{p - c_x}{f}$$

$$y_d = \frac{q_d - c_{yd}}{f_d}$$

y may be calculated by solving the following equation:

$$y_d = y(1 + k_1(x^2 + y^2) + k_2(x^2 + y^2)^2)$$

A value ρ (rho) may be calculated as follows:

$$\rho = \sqrt{x^2+y^2}$$

$x_d$ may be calculated as follows:

$$x_d = x(1+k_1\rho^2+k_2\rho^4)$$

$p_d$ may be calculated as follows:

$$p_d = x_d * f_d + c_{xd}$$

The input row buffer at position $q_d$ may be extracted. The input row buffer may be decimated, if necessary. Interpolation is performed at $(p_d, q_d)$ to generate the row in the intermediate buffer 432.

The following describes processing performed by column rendering component 434 of backward rendering component 404, as illustrated in FIG. 5, according to one embodiment.

For each column in the output image 420, column rendering component 434 of backward rendering component 404 performs the following. Let (p, q) be the coordinates for a pixel in the output column. Note that p would be the same for the entire column. (x, y) may be calculated based on:

$$x = \frac{p - c_x}{f}$$

$$y = \frac{q - c_y}{f}$$

$y_d$ may be calculated as follows:

$$y_d = y(1+k_1(x^2+y^2)+k_2(x^2+y^2)^2)$$

$q_d$ may be calculated based on:

$$q_d = y_d * f_d + c_{yd}$$

The temporary column at position p may be extracted. The extracted temporary column buffer may be decimated, if necessary. Interpolation may be performed at $(p, q_d)$ to generate the column in the output image 420.

Solving for ρ

In one embodiment, ρ may be found from the following equation:

$$\rho_d = \rho*(1+k_1*\rho^2+k_2*\rho^4)$$

In one embodiment, the above equation may be solved iteratively as follows:

$$\rho_0 = \rho_d$$

$$\rho_{(i+1)} = \frac{\rho_d}{(1+k_1*\rho_i^2+k_2*\rho_i^4)}$$

Typically, the above converges in ~10 iterations. One embodiment may start $\rho_0$ with the following:

$$\rho_0 = \rho_d*(1-k_1*\rho_d^2)$$

Solving for x

In one embodiment, x may be found from the following equation:

$$x_d = x(1+k_1(x^2+y_2)+k_2(x^2+y^2)^2)$$

In one embodiment, the equation may be solved iteratively as follows:

$$x_0 = x_d$$

$$x_{(i-1)} \frac{x_d}{(1+k_1(x_i^2+y^2)+k_2(x_i^2+y^2)^2)}$$

Typically, this converges in ~10 iterations.

Any of various interpolation methods, including but not limited to linear and cubic interpolation, may be used to perform interpolation to generate the rows in the intermediate buffer 432 and the columns in the output image 420 in both the forward and backward radial distortion rendering processes described above.

Decimation

Figure 7:
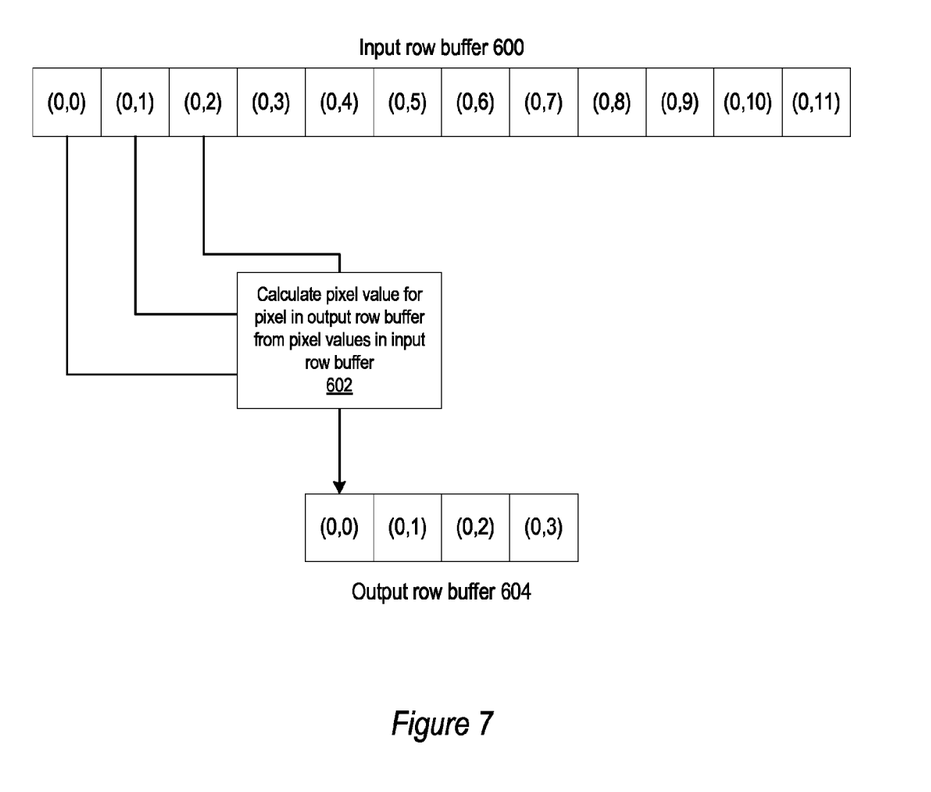
FIG. 7 illustrates a decimation process, according to one embodiment.

FIG. 7 illustrates a decimation process, according to one embodiment. Because embodiments perform one-dimensional (row or column) sampling, in both the forward and backward radial distortion rendering processes, and because the dimensions of the output image may be smaller than the dimensions of the input image, an input row or column may be decimated, if necessary, before row or column interpolation is performed to generate pixel values in an output row or column. Decimation is important in reducing or eliminating aliasing artifacts.

FIG. 7 illustrates decimation of an exemplary input row to generate an exemplary output row, according to one embodiment, but a similar decimation may be performed on an input column to generate an output column. Input row 600 has twelve pixels (0,0) through (0,11), while output row 604 has four pixels (0,0) through (0,3). The pixel value for each pixel in output row 604 may be calculated from pixel values in the input row 600, as indicated at 602. In one embodiment, averaging may be used to calculate the pixel values for the pixels in the output row 604. In this example, the pixel values for the three pixels (0,0) through (0,2) of input row 600 may be averaged to get the pixel value for pixel (0,0) of output row 604, the pixel values for pixels (0,3) through (0,5) of input row 600 may be averaged to get the pixel value for pixel (0,1) of output row 604, and so on. Note that normalization may be performed in calculating the pixel values 602. Other embodiments may use other methods to calculate pixel values in output row 604 from pixel values in input row 604. Once output row 604 is generated, the pixel values in decimated output row 604 may be interpolated to generate pixel values in the intermediate buffer, as described herein. Again note that a similar decimation process may be applied when processing columns.

Exemplary Applications

An exemplary application for embodiments of the radial distortion rendering module may be in a panoramic image stitching process in which a set of component images are to be stitched to form a panoramic image. In the process, a reference image is selected, and the other images are "warped" in accordance with the center of the reference image to create the panoramic image. Embodiments of the radial distortion rendering module as described herein may be used to first remove distortion, via the backward radial distortion rendering process, from each of the component images before warping/stitching the images to form the composite panoramic image.

Embodiments may also be used to simulate lens distortion, for example in composite panoramic images. It may be desirable to generate realistic images; in reality, scenes typically would have some distortion when captured with a camera and real lens. As an example, in a composite panoramic image process as described above, the natural distortion that would be expected may have been removed. Embodiments of the radial distortion rendering module, particularly the forward radial distortion rendering process, may be used to simulate what the distortion effect of a particular lens might be on such an image.

Exemplary System

Various components of embodiments of a radial distortion rendering module may be executed on one or more computer systems, which may interact with various other devices. One such computer system is illustrated by FIG. 8. In the illustrated embodiment, computer system 700 includes one or more processors 710 coupled to a system memory 720 via an input/output (I/O) interface 730. Computer system 700 further includes a network interface 740 coupled to I/O interface 730, and one or more input/output devices 750, such as cursor control device 760, keyboard 770, audio device 790, and display(s) 780. In some embodiments, it is contemplated that embodiments may be implemented using a single instance of computer system 700, while in other embodiments multiple such systems, or multiple nodes making up computer system 700, may be configured to host different portions or instances of embodiments. For example, in one embodiment some elements may be implemented via one or more nodes of computer system 700 that are distinct from those nodes implementing other elements.

In various embodiments, computer system 700 may be a uniprocessor system including one processor 710, or a multiprocessor system including several processors 710 (e.g., two, four, eight, or another suitable number). Processors 710 may be any suitable processor capable of executing instructions. For example, in various embodiments, processors 710 may be general-purpose or embedded processors implementing any of a variety of instruction set architectures (ISAs), such as the x86, PowerPC, SPARC, or MIPS ISAs, or any other suitable ISA. In multiprocessor systems, each of processors 710 may commonly, but not necessarily, implement the same ISA.

System memory 720 may be configured to store program instructions and/or data accessible by processor 710. In various embodiments, system memory 720 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for a radial distortion rendering module, are shown stored within system memory 720 as program instructions 725 and data storage 735, respectively. In other embodiments, program instructions and/or data may be received, sent or stored upon different types of computer-accessible media or on similar media separate from system memory 720 or computer system 700. Generally speaking, a computer-accessible medium may include storage media or memory media such as magnetic or optical media, e.g., disk or CD/DVD-ROM coupled to computer system 700 via I/O interface 730. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 740.

In one embodiment, I/O interface 730 may be configured to coordinate I/O traffic between processor 710, system memory 720, and any peripheral devices in the device, including network interface 740 or other peripheral interfaces, such as input/output devices 750. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. In addition, in some embodiments some or all of the functionality of I/O interface 730, such as an interface to system memory 720, may be incorporated directly into processor 710.

Network interface 740 may be configured to allow data to be exchanged between computer system 700 and other devices attached to a network, such as other computer systems, or between nodes of computer system 700. In various embodiments, network interface 740 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 750 may, in some embodiments, include one or more display terminals, keyboards, keypads, touchpads, scanning devices, voice or optical recognition devices, or any other devices suitable for entering or retrieving data by one or more computer system 700. Multiple input/output devices 750 may be present in computer system 700 or may be distributed on various nodes of computer system 700. In some embodiments, similar input/output devices may be separate from computer system 700 and may interact with one or more nodes of computer system 700 through a wired or wireless connection, such as over network interface 740.

As shown in FIG. 8, memory 720 may include program instructions 725, configured to implement embodiments of a radial distortion rendering module as described herein, and data storage 735, comprising various data accessible by program instructions 725. In one embodiment, program instructions 725 may include software elements of a radial distortion rendering module as illustrated in the above Figures. Data storage 735 may include data that may be used in embodiments. In other embodiments, other or different software elements and data may be included.

Those skilled in the art will appreciate that computer system 700 is merely illustrative and is not intended to limit the scope of a radial distortion rendering module as described herein. In particular, the computer system and devices may include any combination of hardware or software that can perform the indicated functions, including computers, network devices, internet appliances, PDAs, wireless phones, pagers, etc. Computer system 700 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 700 may be transmitted to computer system 700 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc. As well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A computer-implemented method, comprising:
    rendering an output image without radially symmetric distortion from an input image with radially symmetrical distortion, wherein said rendering an output image without radially symmetric distortion comprises:
        rendering each one-dimensional element in a first planar dimension of the input image to generate pixel values in a corresponding one-dimensional element in the first planar dimension of an intermediate buffer, wherein said rendering comprises, for each pixel in each element in the first planar dimension of the intermediate buffer:
            calculating pixel coordinates in the input image corresponding to the coordinates of the current pixel in the intermediate buffer;
            calculating an offset coordinate in the first planar dimension from the calculated pixel coordinates in the input image; and
            performing interpolation at the offset coordinate in the first planar dimension in the input image to generate a pixel value for the current pixel in the intermediate buffer; and
        rendering each one-dimensional element in a second planar dimension of the intermediate buffer to generate pixel values in a corresponding one-dimensional element in the second planar dimension of the output image, wherein said rendering comprises, for each pixel in each element in the second planar dimension of the output image:
            calculating pixel coordinates in the intermediate image corresponding to the coordinates of the current pixel in the output image;
            calculating an offset coordinate in the second planar dimension from the calculated pixel coordinates in the intermediate image; and
            performing interpolation at the offset coordinate in the second planar dimension in the intermediate image to generate a pixel value for the current pixel in the output image.

2. The computer-implemented method as recited in claim 1, wherein the radially symmetric distortion is one of barrel distortion and pincushion distortion.

3. The computer-implemented method as recited in claim 1, wherein the elements in the first planar dimension are rows, and wherein the elements in the second planar dimensions are columns.

4. The computer-implemented method as recited in claim 1, wherein the elements in the first planar dimension are columns, and wherein the elements in the second planar dimensions are rows.

5. The computer-implemented method as recited in claim 1, further comprising decimating the element in the first planar dimension of the input image prior to said interpolation.

6. The computer-implemented method as recited in claim 1, further comprising decimating the element in the second planar dimension of the intermediate buffer prior to said interpolation.

7. The computer-implemented method as recited in claim 1, further comprising:
    rendering a second output image with radially symmetric distortion from a second input image without radially symmetric distortion, wherein said rendering a second output image with radially symmetric distortion comprises:
        rendering each one-dimensional element in a first planar dimension of the second input image to generate pixel values in a corresponding one-dimensional element in the first planar dimension of a second intermediate buffer, wherein said rendering comprises, for each pixel in each element in the first planar dimension of the second intermediate buffer:
            calculating pixel coordinates in the second input image corresponding to the coordinates of the current pixel in the second intermediate buffer;
            calculating an offset coordinate in the first planar dimension from the calculated pixel coordinates in the second input image; and
            performing interpolation at the offset coordinate in the first planar dimension in the second input image to generate a pixel value for the current pixel in the second intermediate buffer; and
        rendering each one-dimensional element in a second planar dimension of the second intermediate buffer to generate pixel values in a corresponding one-dimensional element in the second planar dimension of the second output image, wherein said rendering comprises, for each pixel in each element in the second planar dimension of the second output image:
            calculating pixel coordinates in the second intermediate image corresponding to the coordinates of the current pixel in the second output image;
            calculating an offset coordinate in the second planar dimension from the calculated pixel coordinates in the second intermediate image; and
            performing interpolation at the offset coordinate in the second planar dimension in the second intermediate image to generate a pixel value for the current pixel in the second output image.

8. A system, comprising:
at least one processor; and
a memory comprising program instructions, wherein the program instructions are executable by the at least one processor to render an output image without radially symmetric distortion from an input image with radially symmetric distortion, wherein, to render an output image without radially symmetric distortion, the program instructions are executable by the at least one processor to:
render each one-dimensional element in a first planar dimension of the input image to generate pixel values in a corresponding one-dimensional element in the first planar dimension of an intermediate buffer, wherein, to perform said rendering, the program instructions are executable by the at least one processor to, for each pixel in each element in the first planar dimension of the intermediate buffer:
calculate pixel coordinates in the input image corresponding to the coordinates of the current pixel in the intermediate buffer;
calculate an offset coordinate in the first planar dimension from the calculated pixel coordinates in the input image; and
perform interpolation at the offset coordinate in the first planar dimension in the input image to generate a pixel value for the current pixel in the intermediate buffer; and
render each one-dimensional element in a second planar dimension of the intermediate buffer to generate pixel values in a corresponding one-dimensional element in the second planar dimension of the output image, wherein, to perform said rendering, the program instructions are executable by the at least one processor to, for each pixel in each element in the second planar dimension of the output image:
calculate pixel coordinates in the intermediate image corresponding to the coordinates of the current pixel in the output image;
calculate an offset coordinate in the second planar dimension from the calculated pixel coordinates in the intermediate image; and
perform interpolation at the offset coordinate in the second planar dimension in the intermediate image to generate a pixel value for the current pixel in the output image.

9. The system as recited in claim 8, wherein the elements in the first planar dimension are rows, and wherein the elements in the second planar dimensions are columns.

10. The system as recited in claim 8, wherein the elements in the first planar dimension are columns, and wherein the elements in the second planar dimensions are rows.

11. The system as recited in claim 8, wherein the program instructions are executable by the at least one processor to decimate the element in the first planar dimension of the input image prior to said interpolation.

12. The system as recited in claim 8, wherein the program instructions are executable by the at least one processor to decimate the element in the second planar dimension of the intermediate buffer prior to said interpolation.

13. The system as recited in claim 8, wherein the program instructions are executable by the at least one processor to:
render a second output image with radially symmetric distortion from a second input image without radially symmetric distortion, wherein, to render a second output image with radially symmetric distortion, the program instructions are executable by the at least one processor to:
render each one-dimensional element in a first planar dimension of the second input image to generate pixel values in a corresponding one-dimensional element in the first planar dimension of a second intermediate buffer, wherein, to perform said rendering, the program instructions are executable by the at least one processor to, for each pixel in each element in the first planar dimension of the second intermediate buffer:
calculate pixel coordinates in the second input image corresponding to the coordinates of the current pixel in the second intermediate buffer;
calculate an offset coordinate in the first planar dimension from the calculated pixel coordinates in the second input image; and
perform interpolation at the offset coordinate in the first planar dimension in the second input image to generate a pixel value for the current pixel in the second intermediate buffer; and
render each one-dimensional element in a second planar dimension of the second intermediate buffer to generate pixel values in a corresponding one-dimensional element in the second planar dimension of the second output image, wherein, to perform said rendering, the program instructions are executable by the at least one processor to, for each pixel in each element in the second planar dimension of the second output image:
calculate pixel coordinates in the second intermediate image corresponding to the coordinates of the current pixel in the second output image;
calculate an offset coordinate in the second planar dimension from the calculated pixel coordinates in the second intermediate image; and
perform interpolation at the offset coordinate in the second planar dimension in the second intermediate image to generate a pixel value for the current pixel in the second output image.

14. A computer-readable storage medium storing program instructions, wherein the program instructions are computer-executable to implement:
rendering an output image without radially symmetric distortion from an input image with radially symmetric distortion, wherein, in said rendering an output image without radially symmetric distortion, the program instructions are computer-executable to implement:
rendering each one-dimensional element in a first planar dimension of the input image to generate pixel values in a corresponding one-dimensional element in the first planar dimension of an intermediate buffer, wherein in said rendering the program instructions are computer-executable to implement, for each pixel in each element in the first planar dimension of the intermediate buffer:
calculating pixel coordinates in the input image corresponding to the coordinates of the current pixel in the intermediate buffer;
calculating an offset coordinate in the first planar dimension from the calculated pixel coordinates in the input image; and
performing interpolation at the offset coordinate in the first planar dimension in the input image to generate a pixel value for the current pixel in the intermediate buffer; and
rendering each one-dimensional element in a second planar dimension of the intermediate buffer to generate pixel values in a corresponding one-dimensional element in the second planar dimension of the output image, wherein in said rendering the program instructions are computer-executable to implement, for each pixel in each element in the second planar dimension of the output image:
calculating pixel coordinates in the intermediate image corresponding to the coordinates of the current pixel in the output image;
calculating an offset coordinate in the second planar dimension from the calculated pixel coordinates in the intermediate image; and
performing interpolation at the offset coordinate in the second planar dimension in the intermediate image to generate a pixel value for the current pixel in the output image.

15. The computer-readable storage medium as recited in claim 14, wherein the elements in the first planar dimension are rows, and wherein the elements in the second planar dimensions are columns.

16. The computer-readable storage medium as recited in claim 14, wherein the program instructions are computer-executable to implement decimating the element in the first planar dimension of the input image prior to said interpolating.

17. The computer-readable storage medium as recited in claim 14, wherein the elements in the first planar dimension are columns, and wherein the elements in the second planar dimensions are rows.

18. The computer-readable storage medium as recited in claim 14, wherein the program instructions are computer-executable to implement decimating the element in the second planar dimension of the intermediate buffer prior to said interpolating.

19. The computer-readable storage medium as recited in claim 14, wherein the program instructions are computer-executable to implement:
rendering a second output image with radially symmetric distortion from a second input image without radially symmetric distortion, wherein said rendering a second output image with radially symmetric distortion comprises:
rendering each one-dimensional element in a first planar dimension of the second input image to generate pixel values in a corresponding one-dimensional element in the first planar dimension of a second intermediate buffer, wherein in said rendering the program instructions are computer-executable to implement, for each pixel in each element in the first planar dimension of the second intermediate buffer:
calculating pixel coordinates in the second input image corresponding to the coordinates of the current pixel in the second intermediate buffer;
calculating an offset coordinate in the first planar dimension from the calculated pixel coordinates in the second input image; and
performing interpolation at the offset coordinate in the first planar dimension in the second input image to generate a pixel value for the current pixel in the second intermediate buffer; and
rendering each one-dimensional element in a second planar dimension of the second intermediate buffer to generate pixel values in a corresponding one-dimensional element in the second planar dimension of the second output image, wherein in said rendering the program instructions are computer-executable to implement, for each pixel in each element in the second planar dimension of the second output image:
calculating pixel coordinates in the second intermediate image corresponding to the coordinates of the current pixel in the second output image;
calculating an offset coordinate in the second planar dimension from the calculated pixel coordinates in the second intermediate image; and
performing interpolation at the offset coordinate in the second planar dimension in the second intermediate image to generate a pixel value for the current pixel in the second output image.

20. A computer-implemented method, comprising:
rendering an output image with radially symmetric distortion from an input image without radially symmetric distortion, wherein said rendering an output image with radially symmetric distortion comprises:
rendering each one-dimensional element in a first planar dimension of the input image to generate pixel values in a corresponding one-dimensional element in the first planar dimension of an intermediate buffer, wherein said rendering comprises, for each pixel in each element in the first planar dimension of the intermediate buffer:
calculating pixel coordinates in the input image corresponding to the coordinates of the current pixel in the intermediate buffer;
calculating an offset coordinate in the first planar dimension from the calculated pixel coordinates in the input image; and
performing interpolation at the offset coordinate in the first planar dimension in the input image to generate a pixel value for the current pixel in the intermediate buffer; and
rendering each one-dimensional element in a second planar dimension of the intermediate buffer to generate pixel values in a corresponding one-dimensional element in the second planar dimension of the output image, wherein said rendering comprises, for each pixel in each element in the second planar dimension of the output image:
calculating pixel coordinates in the intermediate image corresponding to the coordinates of the current pixel in the output image;
calculating an offset coordinate in the second planar dimension from the calculated pixel coordinates in the intermediate image; and
performing interpolation at the offset coordinate in the second planar dimension in the intermediate image to generate a pixel value for the current pixel in the output image.

21. The computer-implemented method as recited in claim 20, wherein the radially symmetric distortion is one of barrel distortion and pincushion distortion.

22. The computer-implemented method as recited in claim 20, wherein the elements in the first planar dimension are rows, and wherein the elements in the second planar dimensions are columns.

23. The computer-implemented method as recited in claim 20, wherein the elements in the first planar dimension are columns, and wherein the elements in the second planar dimensions are rows.

24. The computer-implemented method as recited in claim 20, further comprising decimating the element in the first planar dimension of the input image prior to said interpolating.

25. The computer-implemented method as recited in claim 20, further comprising decimating the element in the second planar dimension of the intermediate buffer prior to said interpolating.

26. A system, comprising:
  at least one processor; and
  a memory comprising program instructions, wherein the program instructions are executable by the at least one processor to render an output image with radially symmetric distortion from an input image without radially symmetric distortion, wherein, to render an output image with radially symmetric distortion, the program instructions are executable by the at least one processor to:
    render each one-dimensional element in a first planar dimension of the input image to generate pixel values in a corresponding one-dimensional element in the first planar dimension of an intermediate buffer, wherein, to perform said rendering, the program instructions are executable by the at least one processor to, for each pixel in each element in the first planar dimension of the intermediate buffer:
      calculate pixel coordinates in the input image corresponding to the coordinates of the current pixel in the intermediate buffer;
      calculate an offset coordinate in the first planar dimension from the calculated pixel coordinates in the input image; and
      perform interpolation at the offset coordinate in the first planar dimension in the input image to generate a pixel value for the current pixel in the intermediate buffer; and
    render each one-dimensional element in a second planar dimension of the intermediate buffer to generate pixel values in a corresponding one-dimensional element in the second planar dimension of the output image, wherein, to perform said rendering, the program instructions are executable by the at least one processor to, for each pixel in each element in the second planar dimension of the output image:
      calculate pixel coordinates in the intermediate image corresponding to the coordinates of the current pixel in the output image;
      calculate an offset coordinate in the second planar dimension from the calculated pixel coordinates in the intermediate image; and
      perform interpolation at the offset coordinate in the second planar dimension in the intermediate image to generate a pixel value for the current pixel in the output image.

27. The system as recited in claim 26, wherein the elements in the first planar dimension are rows, and wherein the elements in the second planar dimensions are columns.

28. The system as recited in claim 26, wherein the elements in the first planar dimension are columns, and wherein the elements in the second planar dimensions are rows.

29. The system as recited in claim 26, wherein the program instructions are executable by the at least one processor to decimate the element in the first planar dimension of the input image prior to said interpolating.

30. The system as recited in claim 26, wherein the program instructions are executable by the at least one processor to decimate the element in the second planar dimension of the intermediate buffer prior to said interpolating.

31. A computer-readable storage medium storing program instructions, wherein the program instructions are computer-executable to implement:
  rendering an output image with radially symmetric distortion from an input image without radially symmetric distortion, wherein, in said rendering an output image with radially symmetric distortion, the program instructions are computer-executable to implement:
    rendering each one-dimensional element in a first planar dimension of the input image to generate pixel values in a corresponding one-dimensional element in the first planar dimension of an intermediate buffer, wherein in said rendering the program instructions are computer-executable to implement, for each pixel in each element in the first planar dimension of the intermediate buffer:
      calculating pixel coordinates in the input image corresponding to the coordinates of the current pixel in the intermediate buffer;
      calculating an offset coordinate in the first planar dimension from the calculated pixel coordinates in the input image; and
      performing interpolation at the offset coordinate in the first planar dimension in the input image to generate a pixel value for the current pixel in the intermediate buffer; and
    rendering each one-dimensional element in a second planar dimension of the intermediate buffer to generate pixel values in a corresponding one-dimensional element in the second planar dimension of the output image, wherein in said rendering the program instructions are computer-executable to implement, for each pixel in each element in the second planar dimension of the output image:
      calculating pixel coordinates in the intermediate image corresponding to the coordinates of the current pixel in the output image;
      calculating an offset coordinate in the second planar dimension from the calculated pixel coordinates in the intermediate image; and
      performing interpolation at the offset coordinate in the second planar dimension in the intermediate image to generate a pixel value for the current pixel in the output image.

32. The computer-readable storage medium as recited in claim 31, wherein the elements in the first planar dimension are rows, and wherein the elements in the second planar dimensions are columns.

33. The computer-readable storage medium as recited in claim 31, wherein the program instructions are computer-executable to implement decimating the element in the first planar dimension of the input image prior to said interpolating.

34. The computer-readable storage medium as recited in claim 31, wherein the elements in the first planar dimension are columns, and wherein the elements in the second planar dimensions are rows.

35. The computer-readable storage medium as recited in claim 31, wherein the program instructions are computer-executable to implement decimating the element in the second planar dimension of the intermediate buffer prior to said interpolating.

* * * * *